United States Patent
Wimböck

(10) Patent No.: US 10,484,370 B2
(45) Date of Patent: Nov. 19, 2019

(54) METHOD FOR OPERATING A SECURITY ELEMENT

(71) Applicant: GIESECKE+DEVRIENT MOBILE SECURITY GMBH, München (DE)

(72) Inventor: Ulrich Wimböck, Tutzing (DE)

(73) Assignee: GIESECK+DEVRIENT MOBILE SECURITY GMBH, Munich (DE)

( * ) Notice: Subject to any disclaimer, the term of this patent is extended or adjusted under 35 U.S.C. 154(b) by 55 days.

(21) Appl. No.: 15/549,565

(22) PCT Filed: Feb. 5, 2016

(86) PCT No.: PCT/EP2016/000226
§ 371 (c)(1),
(2) Date: Aug. 8, 2017

(87) PCT Pub. No.: WO2016/128137
PCT Pub. Date: Aug. 18, 2016

(65) Prior Publication Data
US 2018/0241744 A1     Aug. 23, 2018

(30) Foreign Application Priority Data
Feb. 9, 2015   (DE) .................. 10 2015 001 900

(51) Int. Cl.
*H04L 29/06* (2006.01)
*H04L 29/08* (2006.01)
(Continued)

(52) U.S. Cl.
CPC ........ *H04L 63/0853* (2013.01); *G06F 21/575* (2013.01); *H04L 63/102* (2013.01);
(Continued)

(58) Field of Classification Search
CPC ..... H04L 63/0853; H04L 63/20; H04L 67/12; H04L 67/125; H04L 67/306; H04L 29/06;
(Continued)

(56) References Cited

U.S. PATENT DOCUMENTS

| 6,373,931 B1 * | 4/2002 | Amin .................... H04M 15/00 379/112.01 |
| 9,390,259 B2 | 7/2016 | Rudolph et al. |

(Continued)

FOREIGN PATENT DOCUMENTS

| DE | 102012015573 A1 | 2/2014 |
| WO | 2014032750 A1 | 3/2014 |
| WO | 2014095040 A1 | 6/2014 |

OTHER PUBLICATIONS

German Search Report From DE Application No. 10 2015 001 900.7, dated Oct. 9, 2015.
(Continued)

*Primary Examiner* — Jayesh M Jhaveri
(74) *Attorney, Agent, or Firm* — Workman Nydegger

(57) ABSTRACT

A method for operating a security element of a mobile terminal with a memory unit includes using a first subscription profile with a first operating system for the security element, and a second subscription profile with a second operating system for the security element. The method involves operating the security element with the first operating system to communicate with the first subscription profile via a first mobile communication network; switching from the first operating system to the second operating system of the security element through a boot loader in the memory unit loading and executing the second operating system following a reboot of the security element; and operating the security element with the second operating system, to be able to communicate with the second subscription profile via a second mobile communication net-
(Continued)

work. A corresponding security element and a corresponding mobile terminal are provided.

5 Claims, 2 Drawing Sheets

(51) Int. Cl.
| | | |
|---|---|---|
| *G06F 21/57* | (2013.01) | |
| *H04W 8/18* | (2009.01) | |
| *H04W 12/00* | (2009.01) | |
| *H04W 4/50* | (2018.01) | |
| *H04W 12/08* | (2009.01) | |
| *H04W 88/06* | (2009.01) | |

(52) U.S. Cl.
CPC .............. *H04L 63/20* (2013.01); *H04L 67/12* (2013.01); *H04L 67/125* (2013.01); *H04L 67/306* (2013.01); *H04W 4/50* (2018.02); *H04W 8/183* (2013.01); *H04W 12/00405* (2019.01); *H04W 12/08* (2013.01); *H04W 88/06* (2013.01)

(58) Field of Classification Search
CPC ........ H04L 29/08; H04L 63/102; H04W 4/50; H04W 8/183; H04W 12/08; H04W 88/06; H04W 8/18; H04W 12/00; G06F 21/575; G06F 21/57
See application file for complete search history.

(56) References Cited

U.S. PATENT DOCUMENTS

| | | | | |
|---|---|---|---|---|
| 9,820,139 | B1* | 11/2017 | Veneroso | H04B 1/3816 |
| 2013/0165073 | A1* | 6/2013 | Madsen | H04W 12/06 |
| | | | | 455/411 |
| 2013/0237197 | A1 | 9/2013 | Ruvalcaba et al. | |
| 2014/0031083 | A1 | 1/2014 | Vergnes et al. | |
| 2014/0308991 | A1 | 10/2014 | Lee et al. | |
| 2015/0220729 | A1 | 8/2015 | Rudolph et al. | |
| 2016/0088464 | A1* | 3/2016 | Hans | H04W 8/183 |
| | | | | 455/558 |
| 2017/0188226 | A1* | 6/2017 | Wu | H04W 8/183 |
| 2018/0270363 | A1* | 9/2018 | Guday | H04M 15/8083 |
| 2018/0367522 | A1* | 12/2018 | Nix | H04W 12/06 |

OTHER PUBLICATIONS

International Search Report From PCT Application No. PCT/EP2016/000226, dated Apr. 12, 2016.

Suzuki et al., "Standardization of Embedded UICC Remote Provisioning", NTT DOCOMO Technical Journal vol. 16, No. 2, Dec. 31, 2014, pp. 36-41.

EP Search Report from EP Application No. 16705729.8, dated Feb. 11, 2019.

* cited by examiner

METHOD FOR OPERATING A SECURITY ELEMENT

FIELD OF THE INVENTION

The invention relates to a method for operating a security element, as well as such a security element. In particular, the invention relates to a method for operating a security element, for example a SIM or an eUICC of a mobile terminal for logging into a mobile communication network.

BACKGROUND OF THE INVENTION

Communicating by means of a mobile terminal, for example a mobile telephone, via a mobile communication network (also referred to as PLMN [public land mobile network]), which is operated by a network operator (also referred to as MNO [mobile network operator]), usually requires that the mobile terminal is equipped with a security element for securely storing subscription authorization data ("subscription credentials"), which uniquely identify and authenticate the user of the mobile terminal vis-à-vis the mobile communication network. Such subscription authorization data, for example an IMSI (international mobile subscriber identity) and an authentication key usually are part of a so-called subscription profile, which, in addition to the subscription authorization data, can include for example also program code, by which operator-specific cryptographic algorithms are implemented and which accesses functions supplied by an operating system of the security element.

While in the past the vast majority of security elements in the form of SIM cards could be exchanged easily in a mobile terminal, for some time there have existed more and more security elements that are permanently installed in a mobile terminal. Such a security element permanently installed in a mobile terminal is known to the person skilled in the art, in particular under the term "embedded SIM" or "embedded UICC (eUICC)".

Although it is known in principle to make available multiple subscription profiles on a security element, the problem here is that the subscription profiles of different mobile network operators frequently only work with different operating system variants of the security element.

Against this background, it is the object of the present invention to provide an improved method for operating a security element and a correspondingly configured security element, with which the problems described above can be at least partially solved.

SUMMARY OF THE INVENTION

According to a first aspect of the invention, a method is made available for operating a security element of a mobile terminal with a memory unit, in which there are present a first subscription profile with a first operating system for the security element and a second subscription profile with a second operating system for the security element. Therein, the method comprises the following steps of: operating the security element with the first operating system, in order to be able to communicate with the first subscription profile via a first mobile communication network; switching from the first operating system to the second operating system of the security element through a boot loader in the memory unit loading and executing the second operating system following a reboot of the security element; and operating the security element with the second operating system, in order to be able to communicate with the second subscription profile via a second mobile communication network.

Preferably, the step of switching from the first operating system to the second operating system of the security element includes the following steps of: receiving a message from a background system by the security element operated with the first operating system, with the information content that a switch is to be effected from the first operating system to the second operating system of the security element; forwarding the message to the boot loader; and extracting the information content of the message from the message by the boot loader, so that the settings of the boot loader are changed such that the second operating system of the security element is loaded and executed following a reboot of the security element.

Alternatively, the step of switching from the first operating system to the second operating system of the security element includes the following steps of: receiving an input from a user by the security element operated with the first operating system, with the information content that a switch is to be effected from the first operating system to the second operating system of the security element; forwarding the input to the boot loader; and extracting the information content of the input from the input by the boot loader, so that the settings of the boot loader are changed such that the second operating system of the security element is loaded and executed following a reboot of the security element.

Alternatively, the step of switching from the first operating system to the second operating system of the security element includes the following steps of: receiving a message from a background system by the security element operated with the first operating system, with the information content that a switch is to be effected from the first operating system to the second operating system of the security element; extracting the information content of the message from the message by the security element operated with the first operating system; and forwarding the information content of the message to the boot loader, so that the settings of the boot loader are changed such that the second operating system of the security element is loaded and executed following a reboot of the security element.

According to preferred embodiments of the invention, the communication between the security element operated with the first operating system and the boot loader is effected via a suitably configured program library or programming interface or API ("application programming interface").

Preferably, the settings of the boot loader are changed by placing in the boot loader a marker which defines that the second operating system of the security element is loaded and executed following a reboot of the security element.

According to a second aspect of the invention, a security element for a mobile terminal with a memory unit is made available, in which there are present a first subscription profile with a first operating system for the security element and a second subscription profile with a second operating system for the security element. Here, the security element is configured to: be operated with the first operating system, in order to be able to communicate with the first subscription profile via a first mobile communication network; switch from the first operating system to the second operating system of the security element through a boot loader in the memory unit loading and executing the second operating system following a reboot of the security element; and be operated with the second operating system, in order to be able to communicate with the second subscription profile via a second mobile communication network.

Preferably, the security element is configured to switch from the first operating system to the second operating system of the security element through the security element being configured to: receive a message from a background system through the first operating system, with the information content that a switch is to be effected from the first operating system to the second operating system of the security element; forward the message to the boot loader; and extract the information content of the message from the message through the boot loader, so that the settings of the boot loader are changed such that the second operating system of the security element is loaded and executed following a reboot of the security element.

Alternatively, the security element is configured to switch from the first operating system to the second operating system of the security element through the security element being configured to: receive a message from a background system through the first operating system, with the information content that a switch is to be effected from the first operating system to the second operating system of the security element; extract the information content of the message from the message through the first operating system; and forward the information content of the message to the boot loader, so that the settings of the boot loader are changed such that the second operating system of the security element is loaded and executed following a reboot of the security element.

Preferably, the security element is configured such that the communication between the first operating system and the boot loader is effected via a suitably configured program library or programming interface or API ("application programming interface").

According to preferred embodiments of the invention, the security element is configured to change the settings of the boot loader by placing in the boot loader a marker which defines that the second operating system of the security element is loaded and executed following a reboot of the security element.

The security element is for example a data carrier configured in hardware. The security element is arranged, for example, as a permanently integrated component in a terminal, wherein either it cannot be removed in its given form from the terminal, for example as a subscriber identification module, M2M module, co-processor, trusted base, trusted platform module.

Alternatively, the security element is connected to the mobile terminal as a removable module, for example as a chip card, in particular as a subscriber identification module, smart card, mass memory card, USB token, multimedia card, secure micro-SD card, mobile communication network token, for example a UMTS surf stick and/or as an electronic identity document, for example as an electronic identity card or passport with machine-readable identification data of a person stored in a memory area.

According to another alternative, the security element can be configured as a combination of hardware and software components in a trusted part of an operating system of the terminal, which is also known to the person skilled in the art as a secure runtime environment ("trusted execution environment"; TEE). Within such a secure runtime environment, the security element can then be configured, for example, in the form of programs running therein, so-called trustlets.

The security element is fundamentally a computer reduced with regard to construction size and scope of resources, having a processor and at least one interface for communication with an external device. Frequently it has no or only a rudimentary user data output of its own. The security element has in particular a data memory for storing data, information, files and/or applications with associated variables, wherein areas of the data memory can be volatile or non-volatile. The non-volatile data memory can in particular be permanent, for example as a read-only memory, abbreviated as ROM, or semi-permanent, for example as an electrically erasable programmable read-only memory, abbreviated as EEPROM, flash memory, ferroelectric random access memory, abbreviated as FRAM or FeRAM memory, or magneto-resistive random access memory, abbreviated as MRAM memory.

According to a third aspect of the invention, a mobile terminal with a security element according to the second aspect of the invention is made available.

As the person skilled in the art will recognize, the preferred embodiments described above can be implemented advantageously within the scope of the various aspects of the present invention.

BRIEF DESCRIPTION OF THE DRAWINGS

Further features, advantages and objects of the invention will become apparent from the following detailed description of several embodiment examples and alternative embodiments. Reference is made to the figure, wherein there is shown.

DETAILED DESCRIPTION OF VARIOUS EMBODIMENTS

Figure 1:
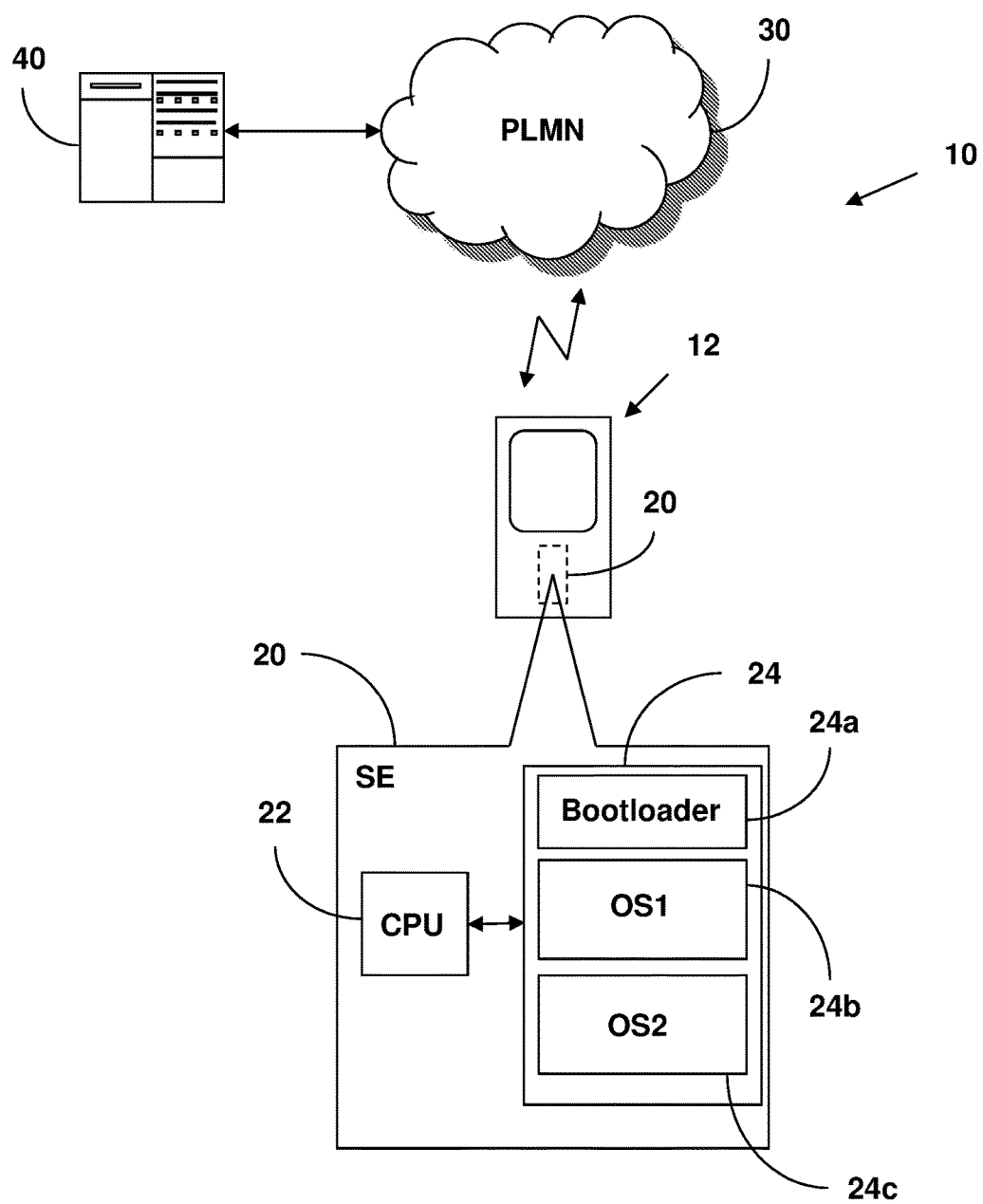
FIG. 1 is a schematic representation of a communication system with a mobile terminal with a security element, illustrating different aspects of the present invention.

FIG. 1 shows a schematic representation of the components of a communication system 10, as well as some of the communication connections between these components, illustrating different aspects of the present invention. Although in the following detailed description reference is made to a "mobile" terminal, the person skilled in the art will recognize that the present invention can be implemented advantageously in connection with any type of terminal which is configured to communicate via a mobile or cellular communication network, thus also with devices the location of which remains practically unchanged. In other words: the attribute "mobile" employed herein refers to the terminal's capability of communicating via a mobile or cellular communication network, including IP-based communication networks.

An exemplary mobile terminal 12 is represented in FIG. 1, which preferably includes a security element ("secure element") 14 for securely storing and processing data which uniquely identify the mobile terminal 12 and/or its user, for example. As indicated in FIG. 1, the mobile terminal 12 is preferably a mobile telephone, a smart phone or a similar apparatus. The person skilled in the art will recognize, however, that the mobile terminal 20 according to the present invention can be implemented likewise in the form of other apparatus adapted to communicate via a mobile communication network, such as for example a tablet computer, a notebook, a TV system, a set-top box, a vending machine, an automobile, a surveillance camera, a sensor apparatus, and the like.

According to preferred embodiments of the invention, the security element 14 is configured as an eUICC (embedded universal integrated circuit card) with a SIM application implemented thereon, i.e. as a security element which is a permanent component of the mobile terminal 12 and is employed in a mobile communication network for the unique and secure identification of the user or subscriber and for making available different functions and value added services. Alternatively, the security element 14 can be configured as a UICC (universal integrated circuit card) or SIM card (subscriber identity module), which is known to the person skilled in the art as one of the forms of a security element currently most commonly used. The person skilled in the art will recognize, however, that other types of security elements, which, depending on the respective generation and type of the underlying mobile communication standard, are referred to as USIM, R-UIM, ISIM and the like, are likewise encompassed by the present invention According to further preferred embodiments of the invention, the security element 14 can be configured as a combination of hardware and software components in a trusted part of an operating system of a central processing unit of the mobile terminal 12, which is known to the person skilled in the art also as a secure runtime environment ("trusted execution environment"; TEE). Within such a secure runtime environment of the mobile terminal 12, the security element 14 can then be configured for example in the form of programs running therein, so-called Trustlets®.

The mobile terminal 12 is configured to communicate via the over-the-air interface with a mobile communication network (also referred to briefly as "mobile communication network" or "public land mobile network" [PLMN]) of a mobile communication system 20. As is known to the person skilled in the art, the mobile terminal 12 can have a GSM module (not represented in FIG. 1) with an antenna for receiving and sending radio waves for this purpose.

In FIG. 1, the mobile networks 30 and 40 are exemplified. It is conceivable here that the mobile communication network 30 is operated by a first mobile network operator (MNO) and the second mobile communication network 40 is operated by a second mobile network operator. According to preferred embodiments of the invention, the mobile communication network 30 and/or the mobile communication network 40 are operated in accordance with the GSM standard ("global standard for mobile communications").

In the following, preferred embodiments of the invention will be described in connection with mobile communication networks 30, 40 as part of the mobile communication system 20 according to the GSM standard, which is specified in a multiplicity of ETSI specifications. The person skilled in the art will recognize, however, that the present invention can also be used advantageously in connection with other mobile communication networks. Such networks include third-generation (3GPP) mobile communication networks, such as UMTS (universal mobile telecommunications system), fourth-generation (4G) mobile communication networks, such as LTE (long term evolution), and other mobile communication networks, such as CDMA and the like.

As is known to the person skilled in the art, a mobile communication network or PLMN constructed in accordance with the GSM standard generally comprises a BSS ("base station subsystem") consisting of a multiplicity of BTSs ("base transceiver station") which define respective radio cells of the PLMN and are connected to a BSC ("base station controller"). Usually the BSC is a multiplicity of BSCs which communicate with a common MSC ("mobile switching center"). Frequently, a local database, called VLR ("visitor location register"), forms part of the MSC to hold available information about the mobile communication subscribers currently located in the radio cells which are supplied by an MSC (i.e. the region covered by an MSC). The MSC makes available substantially the same functionality as a relay switch in the fixed network (public-switched telephone network; PSTN) and is in communication with an HLR ("home location register") which is the primary database of the PLMN in which information for the login and/or authentication of mobile communication subscribers is stored. For this purpose, the HLR usually has access to an AUC ("authentication center"). As is known to the person skilled in the art, the communication connections between the above-described components of a PLMN can be based on proprietary and/or open standards. The protocols employed can be SS7- or IP-based, for example. It is left up to the MNO how the network components are formed as separate or combined units and how the interfaces are formed between these components, so that the above description is to be understood merely as an example.

The person skilled in the art will recognize that, although the above-described functional units of a conventional mobile communication network according to the GSM standard can have different names in other or future mobile communication standards, the underlying principles are substantially equal and these are therefore also encompassed by the invention.

For the sake of clarity, of the above-described components of a mobile communication network there are shown merely the following in the schematic representation of FIG. 1: an exemplary BTS 32 and an HLR 34 for the mobile communication network 30 and an exemplary BTS 42, as well as an HLR 44 for the mobile communication network 40. As can be seen in FIG. 1, the mobile communication network 30 and the mobile communication network 40 are at least intermittently in communication with a background system 50, preferably in the form of a suitably configured server, as will be described in detail below. The mobile communication network 30 and/or the mobile communication network 40 can each have, in addition to functional units known to the person skilled in the art, for example an SMS-C ("short message service center") for storing, forwarding, converting and delivering SMS messages, by means of which data can be transferred from the background system 50 to the security element 14 of the mobile terminal 12, for example.

Figure 2:
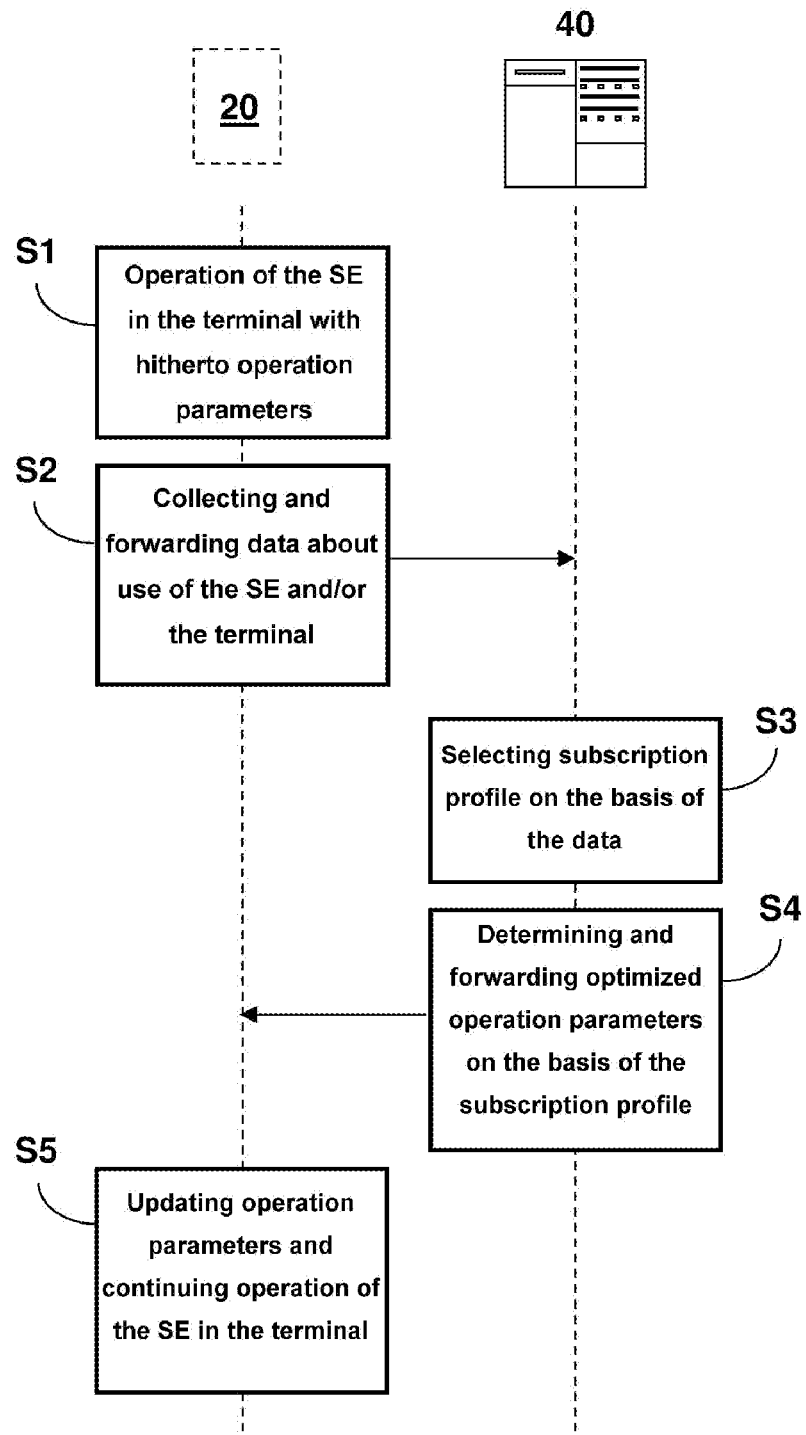
FIG. 2 is a schematic representation showing features for managing subscription profiles on the security element.

As can be seen in the magnified view of the security element 14 in FIG. 1, the security element 14 preferably includes a central processing unit or a central processor ("central processing unit"; CPU) 15. Preferably, the processor 15 is equipped such that applications on can be executed on the processor 15, such as a subscription management application ("subscription management applet"; SM applet), which preferably makes available at least some of the features for managing subscription profiles on the security element 14, as will be described in detail below in connection with FIG. 2. Preferably the subscription management application 16 is implemented in the form of a Java applet. To make available a corresponding execution environment for the SM applet 16, preferably a secure operating system (not shown in FIG. 1) can be implemented on the processor 15.

The security element 14 preferably further comprises a memory unit 17, which is preferably implemented as a non-volatile, rewritable memory unit, for example in the form of a flash memory. The memory unit 17 is configured to receive a plurality of subscription profiles, for example the subscription profiles SP1 and SP2 shown in the figure. According to the invention, the exemplary subscription profiles SP1 and SP2 represented in the figure can contain different operating systems for the security element 14. In other words: According to the invention, the first subscription profile SP1 and the second subscription profile SP2 each contain an operating system for the security element 14, wherein the operating systems of the subscription profiles SP1 and SP2 can be one and the same operating system or different operating systems for the security element 14. Further, the subscription profile SP1 and the subscription profile SP2 contain data which enable the security element 14 and the mobile terminal 12 to log into the mobile communication network 30 and/or the mobile communication network 40 and communicate using the same, i.e. subscription authorization data ("subscription credentials"), such as an IMSI and/or an authentication key $K_i$.

According to the invention, further a boot loader 18 is stored in the memory unit 17, which is called up and executed upon each reboot or reset of the security element 14. The boot loader 18 is configured to load and start either the operating system contained in the subscription profile SP1 or the operating system contained in the subscription profile SP2 for the security element 14. Once the boot loader 18 has fulfilled this task, the security element 14 is operated with the corresponding operating system, thus for example with the operating system contained in the subscription profile SP1 or with operating system contained the in subscription profile SP2.

As the person skilled in the art will recognize, in this state it is possible to communicate exclusively with the active operating system of the security element 14 from the outside, for example by the background system 50. The boot loader 18 and the inactive operating system cannot be addressed from the outside in this state. Here thus the partial problem occurs of how the boot loader 18 of the security element 14, which starts automatically following a reboot or reset of the security element 14 and is thus not "responsive", can be caused upon the next reboot of the security element 14 to load an inactive operating system of a desired subscription profile, for example that of the subscription profile SP2, instead of the active operating system, for example that of the subscription profile SP1.

According to preferred embodiments of the invention it is provided for solving this problem that the active operating system of the security element 14 can receive a message from the background system 50, for example an SMS message, that the security element 14 is intended to switch from the active subscription profile and hence from the active operating system, to an inactive subscription profile and an inactive operating system. The security element operated with the active operating system is configured to forward this message to the boot loader 18.

According to the invention, the boot loader 18 is configured to analyze the forwarded message and to extract the information therefrom that a switch is to be effected to a certain inactive subscription profile and thus to a certain inactive operating system. The communication between the active operating system and the boot loader 18 is preferably effected here via a suitably configured program library or programming interface or API ("application programming interface"). Such a program library or API can make available for example a function "subscriptionprofileswitch(SP2)", wherein the parameter to be passed to this function specifies the subscription profile and thus operating system to which the switch is to be effected. It is conceivable that upon calling up such a function of the API a marker is placed in the boot loader 18, which defines which subscription profile and hence which operating system is loaded upon the next execution of the boot loader 18, i.e. upon the next reboot of the security element 14.

According to an alternative, the extraction of the information from the message from the background system 50 is effected by the active operating system itself, which then merely forwards the extracted information to the boot loader 18 that a switch to a certain inactive subscription profile and thus to a certain inactive operating system is to be effected.

According to preferred embodiments of the invention, the switching from the first subscription profile to the second subscription profile can be triggered by the mobile terminal 12, in particular by an input of the user of the mobile terminal 12.

The invention claimed is:

1. A method for operating a security element of a mobile terminal with a memory unit, in which there are present a first subscription profile with a first operating system for the security element and a second subscription profile with a second operating system for the security element, wherein the method includes the following steps of:
    operating the security element with the first operating system, in order to be able to communicate with the first subscription profile via a first mobile communication network;
    switching from the first operating system to the second operating system of the security element through a boot loader in the memory unit loading and executing the second operating system following a reboot of the security element; and
    operating the security element with the second operating system, in order to be able to communicate with the second subscription profile via a second mobile communication network;
    wherein the switching includes:
        receiving a message from a background system by the security element operated with the first operating system, with the information content that a switch is to be effected from the first operating system to the second operating system of the security element;
        forwarding the message to the boot loader; and
        extracting the information content of the message from the message by the boot loader, so that the settings of the boot loader are changed such that the second operating system of the security element is loaded and executed following a reboot of the security element,
        wherein the settings of the boot loader are changed by placing in the boot loader a marker which defines that the second operating system of the security element is loaded and executed following a reboot of the security element; and/or
        receiving an input from a user by the security element operated with the first operating system, with the information content that a switch is to be effected from the first operating system to the second operating system of the security element;
        forwarding the input to the boot loader; and
        extracting the information content of the input from the input by the boot loader, so that the settings of the boot loader are changed such that the second operating system of the security element is loaded and executed following a reboot of the security element,
        wherein the settings of the boot loader are changed by placing in the boot loader a marker which defines that the second operating system of the security element is loaded and executed following a reboot of the security element; and/or
        receiving a message from a background system by the security element operated with the first operating system, with the information content that a switch is to be effected from the first operating system to the second operating system of the security element;

extracting the information content of the message from the message by the security element operated with the first operating system; and forwarding the information content of the message to the boot loader, so that the settings of the boot loader are changed such that the second operating system of the security element is loaded and executed following a reboot of the security element, wherein the settings of the boot loader are changed by placing in the boot loader a marker which defines that the second operating system of the security element is loaded and executed following a reboot of the security element.

2. The method according to claim 1, wherein the communication between the security element operated with the first operating system and the boot loader is effected via a suitably configured program library or programming interface or API ("application programming interface").

3. A security element for a mobile terminal with a memory unit, in which there are present a first subscription profile with a first operating system for the security element and a second subscription profile with a second operating system for the security element, wherein the security element is configured to:

be operated with the first operating system, in order to be able to communicate with the first subscription profile via a first mobile communication network;

switch from the first operating system to the second operating system of the security element through a boot loader in the memory unit loading and executing the second operating system following a reboot of the security element;

be operated with the second operating system, in order to be able to communicate with the second subscription profile via a second mobile communication network;

wherein the switch includes:

receiving a message from a background system by the first operating system, with the information content that a switch is to be effected from the first operating system to the second operating system of the security element;

forwarding the message to the boot loader; and extracting the information content of the message from the message by the boot loader, so that the settings of the boot loader are changed such that the second operating system of the security element is loaded and executed following a reboot of the security element, wherein the settings of the boot loader are changed by placing in the boot loader a marker which defines that the second operating system of the security element is loaded and executed following a reboot of the security element; and/or receiving a message from a background system by the first operating system, with the information content that a switch is to be effected from the first operating system to the second operating system of the security element;

extracting the information content of the message from the message by the first operating system; and forwarding the information content of the message to the boot loader, so that the settings of the boot loader are changed such that the second operating system of the security element is loaded and executed following a reboot of the security element, wherein the security element is configured to change the settings of the boot loader by placing in the boot loader a marker which defines that the second operating system of the security element is loaded and executed following a reboot of the security element.

4. The security element according to claim 3, wherein the security element is configured such that the communication between the first operating system and the boot loader is effected via a suitably configured program library or programming interface or API ("application programming interface").

5. A mobile terminal comprising:

a security element, the security element comprising:

a memory unit, in which there are present a first subscription profile with a first operating system for the security element and a second subscription profile with a second operating system for the security element, wherein the security element is configured to:

be operated with the first operating system, in order to be able to communicate with the first subscription profile via a first mobile communication network;

switch from the first operating system to the second operating system of the security element through a boot loader in the memory unit loading and executing the second operating system following a reboot of the security element; and be operated with the second operating system, in order to be able to communicate with the second subscription profile via a second mobile communication network;

wherein the switch includes:

receiving a message from a background system by the first operating system, with the information content that a switch is to be effected from the first operating system to the second operating system of the security element;

forwarding the message to the boot loader; and extracting the information content of the message from the message by the boot loader, so that the settings of the boot loader are changed such that the second operating system of the security element is loaded and executed following a reboot of the security element, wherein the settings of the boot loader are changed by placing in the boot loader a marker which defines that the second operating system of the security element is loaded and executed following a reboot of the security element; and/or receiving a message from a background system by the first operating system, with the information content that a switch is to be effected from the first operating system to the second operating system of the security element;

extracting the information content of the message from the message by the first operating system; and forwarding the information content of the message to the boot loader, so that the settings of the boot loader are changed such that the second operating system of the security element is loaded and executed following a reboot of the security element, wherein the security element is configured to change the settings of the boot loader by placing in the boot loader a marker which defines that the second operating system of the security element is loaded and executed following a reboot of the security element.

\* \* \* \* \*